(12) United States Patent
Eoff et al.

(10) Patent No.: US 7,114,568 B2
(45) Date of Patent: Oct. 3, 2006

(54) HYDROPHOBICALLY MODIFIED POLYMERS FOR A WELL COMPLETION SPACER FLUID

(75) Inventors: Larry S. Eoff, Duncan, OK (US); Eldon D. Dalrympre, Duncan, OK (US); B. Raghava Reddy, Duncan, OK (US); Frank Zamora, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 151 days.

(21) Appl. No.: 10/825,001

(22) Filed: Apr. 15, 2004

(65) Prior Publication Data

US 2005/0230114 A1 Oct. 20, 2005

(51) Int. Cl.
*E21B 33/13* (2006.01)

(52) U.S. Cl. ........................ 166/291; 166/295; 507/219; 507/224; 507/225; 507/226; 507/928; 523/130

(58) Field of Classification Search ................ 166/291, 166/295; 175/72; 507/219, 224, 225, 226, 507/928; 523/130
See application file for complete search history.

(56) References Cited

U.S. PATENT DOCUMENTS

| | | | |
|---|---|---|---|
| 2,863,832 A | 12/1958 | Perrine | |
| 2,910,436 A | 10/1959 | Fatt et al. | |
| 3,215,199 A | 11/1965 | Dilgren | |
| 3,251,415 A | 5/1966 | Bombardieri et al. | |
| 3,297,090 A | 1/1967 | Dilgren | |
| 3,307,630 A | 3/1967 | Dilgren et al. | |
| 3,382,924 A | 5/1968 | Veley et al. | 166/42 |
| 3,434,971 A | 3/1969 | Atkins | |
| 3,441,085 A | 4/1969 | Gidley | 166/307 |
| 3,451,818 A | 6/1969 | Wareham | 96/78 |
| 3,744,566 A | 7/1973 | Szabo et al. | 166/275 |
| 3,910,862 A | 10/1975 | Barabas et al. | 260/79.3 MU |
| 4,129,183 A | 12/1978 | Kalfoglou | 166/300 |
| 4,142,595 A | 3/1979 | Anderson et al. | 175/72 |
| 4,152,274 A | 5/1979 | Phillips et al. | 876/296 |
| 4,158,521 A | 6/1979 | Anderson et al. | 405/264 |
| 4,158,726 A | 6/1979 | Kamada et al. | 526/200 |
| 4,228,277 A * | 10/1980 | Landoll | 536/90 |
| 4,299,710 A | 11/1981 | Dupre et al. | |
| 4,366,071 A | 12/1982 | McLaughlin et al. | |
| 4,366,072 A | 12/1982 | McLaughlin et al. | |
| 4,366,073 A | 12/1982 | McLaughlin et al. | |
| 4,366,074 A | 12/1982 | McLaughlin et al. | |
| 4,374,739 A | 2/1983 | McLaughlin et al. | |
| 4,393,939 A | 7/1983 | Smith et al. | 166/293 |
| 4,395,340 A | 7/1983 | McLaughlin | |
| 4,401,789 A | 8/1983 | Gideon | 524/827 |
| 4,439,334 A | 3/1984 | Borchardt | |
| 4,440,649 A | 4/1984 | Loftin et al. | |
| 4,447,342 A | 5/1984 | Borchardt et al. | |
| 4,460,627 A | 7/1984 | Weaver et al. | 427/212 |
| 4,462,718 A | 7/1984 | McLaughlin et al. | 405/264 |
| 4,532,052 A | 7/1985 | Weaver et al. | |
| 4,536,297 A | 8/1985 | Loftin et al. | |
| 4,536,303 A | 8/1985 | Borchardt | |
| 4,536,305 A | 8/1985 | Borchardt et al. | |
| 4,552,670 A | 11/1985 | Lipowski et al. | 704/553 |
| 4,554,081 A | 11/1985 | Borchardt et al. | |
| 4,563,292 A | 1/1986 | Borchardt | |
| 4,604,216 A | 8/1986 | Irvin et al. | |
| 4,627,926 A | 12/1986 | Peiffer et al. | |
| 4,671,883 A | 6/1987 | Connell | |
| 4,693,639 A | 9/1987 | Hollenbeak et al. | 405/263 |
| 4,699,722 A | 10/1987 | Dymond et al. | |
| 4,730,028 A | 3/1988 | Bock et al. | 526/225 |
| 4,814,096 A | 3/1989 | Evani | |
| 4,828,726 A | 5/1989 | Himes et al. | |
| 4,959,432 A | 9/1990 | Fan et al. | 526/287 |
| 5,071,934 A | 12/1991 | Peiffer | 526/307 |
| 5,097,904 A | 3/1992 | Himes | 166/294 |
| 5,146,986 A | 9/1992 | Dalrymple | 166/294 |
| 5,160,642 A | 11/1992 | Schield et al. | |
| 5,197,544 A | 3/1993 | Himes | 166/294 |
| 5,208,216 A | 5/1993 | Williamson et al. | 507/120 |
| 5,244,042 A | 9/1993 | Dovan et al. | 166/270 |
| 5,271,466 A | 12/1993 | Harms | 166/300 |
| 5,342,530 A | 8/1994 | Aften et al. | 252/8.551 |
| 5,379,841 A | 1/1995 | Pusch et al. | 166/295 |
| 5,382,371 A | 1/1995 | Stahl et al. | 507/221 |
| 5,597,783 A * | 1/1997 | Audibert et al. | 507/129 |
| 5,607,902 A | 3/1997 | Smith et al. | 507/120 |
| 5,637,556 A * | 6/1997 | Argillier et al. | 507/120 |
| 5,646,093 A | 7/1997 | Dino | 507/209 |
| 5,669,456 A | 9/1997 | Audibert et al. | 175/72 |
| 5,720,347 A * | 2/1998 | Audibert et al. | 166/294 |
| 5,728,653 A | 3/1998 | Audibert et al. | 507/222 |

(Continued)

FOREIGN PATENT DOCUMENTS

DE 2 250 552 4/1974

(Continued)

OTHER PUBLICATIONS

U.S. Appl. No. 10/763,800, filed Jan. 24, 2004, Eoff et al.

(Continued)

*Primary Examiner*—George Suchfield
(74) *Attorney, Agent, or Firm*—Robert A. Kent; Haynes and Boone, LLP

(57) ABSTRACT

A method and composition is provided for a relative permeability modifier for use with aqueous well treatment fluids that comprises a hydrophobically modified water soluble polymer or a hydrophilically modified water soluble polymer.

21 Claims, No Drawings

U.S. PATENT DOCUMENTS

| | | | |
|---|---|---|---|
| 5,735,349 A | 4/1998 | Dawson et al. | 166/295 |
| 5,887,653 A | 3/1999 | Bishop et al. | 166/281 |
| 5,944,106 A | 8/1999 | Dalrymple et al. | 166/281 |
| 5,972,848 A | 10/1999 | Audibert et al. | 507/119 |
| 5,979,557 A | 11/1999 | Card et al. | 166/300 |
| 6,020,289 A | 2/2000 | Dymond | 507/120 |
| 6,070,664 A | 6/2000 | Dalrymple et al. | 166/281 |
| 6,124,245 A | 9/2000 | Patel | 507/120 |
| 6,187,839 B1 | 2/2001 | Eoff et al. | 523/130 |
| 6,228,812 B1 | 5/2001 | Dawson et al. | 507/221 |
| 6,237,687 B1 | 5/2001 | Barbee, Jr. et al. | 166/278 |
| 6,253,851 B1 | 7/2001 | Schroeder, Jr. et al. | 166/278 |
| 6,277,900 B1 | 8/2001 | Oswald et al. | 523/130 |
| 6,283,210 B1 | 9/2001 | Soliman et al. | 166/270 |
| 6,359,047 B1 | 3/2002 | Thieu et al. | 524/376 |
| 6,364,016 B1 | 4/2002 | Dalrymple et al. | 166/270 |
| 6,380,137 B1 | 4/2002 | Heier et al. | 507/121 |
| 6,476,169 B1 | 11/2002 | Eoff et al. | 526/307.2 |
| 6,476,283 B1 | 11/2002 | Devore et al. | 585/250 |
| 6,497,283 B1 | 12/2002 | Eoff et al. | 166/293 |
| 6,516,885 B1 | 2/2003 | Munday | 166/295 |
| 6,569,983 B1 | 5/2003 | Treybig et al. | 528/102 |
| 6,609,578 B1 | 8/2003 | Patel et al. | 175/64 |
| 6,627,719 B1 | 9/2003 | Whipple et al. | 774/325 |
| 6,710,107 B1 | 3/2004 | Audibert et al. | 524/5 |
| 6,787,506 B1 | 9/2004 | Blair et al. | 507/222 |
| 6,803,348 B1 | 10/2004 | Jones et al. | 507/100 |
| 6,855,672 B1 | 2/2005 | Poelker | 507/225 |
| 2003/0019627 A1 | 1/2003 | Qu et al. | 166/281 |
| 2003/0104948 A1 | 6/2003 | Poelker et al. | 507/100 |
| 2003/0191030 A1 | 10/2003 | Blair et al. | 507/225 |
| 2004/0045712 A1 | 3/2004 | Eoff et al. | 166/293 |
| 2004/0102331 A1 | 5/2004 | Chan et al. | 507/100 |
| 2004/0171495 A1 | 9/2004 | Zamora et al. | 507/100 |
| 2004/0220058 A1 | 11/2004 | Eoff et al. | 507/200 |
| 2004/0229756 A1 | 11/2004 | Eoff et al. | 507/219 |
| 2004/0229757 A1 | 11/2004 | Eoff et al. | 507/219 |
| 2005/0000694 A1 | 1/2005 | Dalrymple et al. | 166/307 |
| 2005/0230116 A1* | 10/2005 | Eoff et al. | 166/305.1 |

FOREIGN PATENT DOCUMENTS

| | | |
|---|---|---|
| EP | 0383337 A2 | 8/1990 |
| EP | 0 896 122 A2 | 2/1999 |
| EP | 1033378 | 2/2000 |
| EP | 1 033 378 A1 | 9/2000 |
| EP | 1193365 A1 | 4/2002 |
| EP | 1 312 753 A1 | 5/2003 |
| GB | 2 221 940 A | 2/1990 |
| GB | 2335428 A | 9/1999 |
| WO | WO 93/15164 | 8/1993 |
| WO | WO 99/49183 | 9/1999 |
| WO | WO 99/50530 | 10/1999 |
| WO | WO 2000/78890 | 12/2000 |
| WO | WO 02/097236 A1 | 12/2002 |
| WO | WO 2003/056130 | 7/2003 |
| WO | WO 04/101706 A1 | 11/2004 |
| WO | WO 2004/094781 | 11/2004 |

OTHER PUBLICATIONS

U.S. Appl. No. 10/780,995, filed Feb. 18, 2004, Eoff et al.
U.S. Appl. No. 10/806,894, filed Mar. 23, 2004, Eoff et al.
Botermans, C. Wouter, et al, *Relative Permeability Modifiers: Myth or Reality?*, SPE eLibrary Paper No. 68973, 2001, Society of Petroleum Engineers, Inc., presented at SPE European Formation Damage Conference, The Hague, The Netherlands, May 21-22, pp. 1-2, printed from website @ http://speonline.spe.org/cgi-bin/viewpaper.cgi?paper=00068973.pdf.
Eoff, Larry, et al, *Structure and Process Optimization for the Use of a Polymeric Relative-Permeability Modifier in Conformance Control*, SPE eLibrary Paper No. 64985, 2001, Society of Petroleum Engineers, Inc., presented at SPE International Symposium on Oilfield Chemistry, Houston, TX, Feb. 13-16, pp. 1-2, printed from website @ http://speonline.spe.org/cgi-bin/viewpaper.cgi?paper=00064985.pdf.
Inikori, Solomon Ovueferaye, *Numerical Study of Water Coning Control with Downhole Water Sink (DWS) Well Completions in Vertical and Horizontal Wells*, A Dissertation, Aug. 2002, Title Page, Contents, Abstract and pp. 17-18, Submitted to the Graduate Faculty of the Louisiana State University and Agricultural and Mechanical College, The Department of Petroleum Engineering.
Halliburton, 2001 Press Releases, *Halliburton Technology Uses Revolutionary Polymer System to Control Unwanted Water Production*, 2002 Halliburton, pp. 1-2, printed from website @ www.halliburton.com/news/archive/2001/esgnws_053101.jsp?printMe.
Halliburton, 2001 Press Releases, *First Halliburton H2Zero™ Conformance Solution Job Performed for a Producing Well in Egypt*, 2002 Halliburton, pp. 1-2, printed from website @ www.halliburton.com/news/archive/2001/esgnws_111901.jsp.
Halliburton, 2001 Press Releases, *Halliburton Performs First H2Zero™ Conformance Solution Job in North America*, 2002 Halliburton, pp. 1-2, printed from website @ www.halliburton.com/news/archive/2001/esgnws_082201.jsp.
BJ Services Company, *Aquacon, Product Information*, Aug. 1, 2001, pp. 1-2.
BJ Services Company, *Aquatrol I, Product Information*, Dec. 14, 2000, pp. 1-2.
Botermans, C. Wouter, et al, *Relative Permeability Modifiers: Myth or Reality?*, SPE No. 68973, 2001, Society of Petroleum Engineers, Inc., presented at SPE European Formation Damage Conference, The Hague, The Netherlands, May 21-22, pp. 1-13 (previously listed as website address, SPE eLibrary).
Eoff, Larry, et al, *Structure and Process Optimization for the Use of a Polymeric Relative-Permeability Modifier in Conformance Control*, SPE No. 64985, 2001, Society of Petroleum Engineers, Inc., presented at SPE International Symposium on Oilfield Chemistry, Houston, TX, Feb. 13-16, pp. 1-14 (previously listed as website address, SPE eLibrary).
U.S. Appl. No. 10/825,001, filed Apr. 15, 2004, Eoff et al.
U.S. Appl. No. 10/872,997, filed Jun. 21, 2004, Eoff et al.
U.S. Appl. No. 10/881,198, filed Jun. 29, 2004, Dalrymple et al.
U.S. Appl. No. 10/893,210, filed Jul. 16, 2004, Eoff et al.
U.S. Appl. No. 11/,102,062, filed Apr. 8, 2005, Sierra et al.
Paper entitled "Controlling Formation Damage Using Clay Stabilizers: A Review", by Z. J. Zhou et al., dated 1995.
Xu, et al.., Modeling of Laser Spallation Drilling of Rocks For Gas-and Oilwell Drilling, SPE 95746, 2005.
Gahan, et al., Effect of Downhole Pressure Conditions on High-Power Laser Perforation, SPE 97093, 2005.
Gahan, et al., Analysis of Efficient High-Power Fiber Lasers of Well Perforation, SPE 90661, 2004.
Parker, et al., Well Perforation Using High-Power Lasers, SPE 84418, 2003.
Parker, et al., Laser Drilling: Effects of Beam Application Methods on Improving Rock Removal, SPE 84353, 2003.
Bai, et al., Improved Determination of Stree-Dependent Permeability For Anisotropic Formations, SPE 78188, 2002.
Proett, et al., Advanced Permeability and Anisotropy Measurements While Testing and Sampling in Real-Time Using a Dual Probe Formation Tester, SPE 62919, 2000.
Proett, et al., Advanced Dual Probe Formation Tester With Transient, Harmonic, and Pulsed Time-Delay Testing Methods Determines Permeability, Skin and Anisotropy, SPE 64650, 2000.

* cited by examiner

HYDROPHOBICALLY MODIFIED POLYMERS FOR A WELL COMPLETION SPACER FLUID

BACKGROUND

The present embodiment relates generally to a relative permeability modifying polymer for use with spacer fluids for introduction into a subterranean zone penetrated by a well bore.

While drilling oil and gas wells, a drilling fluid is circulated through the string of drill pipe, through the drill bit and upwardly to the earth's surface through the annulus formed between the drill pipe and the surface of the well bore, thereby cooling the drill bit, lubricating the drill string and removing cuttings from the well bore.

When the desired drilling depth of the well is reached, another "performance" fluid, such as a slurry containing a cement composition, is pumped into the annularspace between the walls of the well bore and pipe string or casing. In this process, known as "primary cementing," the cement composition sets in the annulus, supporting and positioning the casing, and forming a substantially impermeable barrier, or cement sheath, which isolates the casing from subterranean zones.

A spacer fluid is a fluid used to displace one performance fluid, such as a drilling fluid, in a well bore before the introduction into the well bore of another performance fluid, such as a cement slurry. Spacer fluids are often used in oil and gas wells to facilitate improved displacement efficiency when pumping new fluids into the well bore. Spacer fluids are also used to enhance solids removal during drilling operations, to enhance displacement efficiency and to physically separate chemically incompatible fluids. For instance, in primary cementing, the cement slurry is separated from the drilling fluid and partially dehydrated gelled drilling fluid may be removed from the walls of the well bore by a spacer fluid pumped between the drilling fluid and the cement slurry. Spacer fluids may also be placed between different drilling fluids during drilling fluid change outs or between a drilling fluid and a completion brine.

It is understood that the well bore may pass through zones which produce water instead of hydrocarbons. Besides being highly undesirable during the production phase of a well, water producing zones can cause problems in the well bore with certain completion activities.

Recently, wells in the production phase have been successfully treated with compounds known as relative permeability modifiers, which decrease the co-production of water with hydrocarbons by reducing the flow of water through hydrocarbon producing formations, yet have little or no effect on the permeability of the formations with respect to hydrocarbons. However, it is desirable to curb water production as early as possible in the life of a well, and to produce more effective relative permeability modifying compositions.

Thus, what is needed is a method and composition for modifying the permeability of water producing zones by the use of a relative permeability modifying composition in a spacer fluid.

DESCRIPTION

The present embodiment provides an aqueous well treatment fluid comprising a water soluble relative permeability modifier. According to a first embodiment, the water soluble relative permeability modifier is a hydrophobically modified water soluble polymer. According to a second embodiment, the water soluble relative permeability modifier is a hydrophilically modified water soluble polymer.

In the first embodiment, the hydrophobically modified relative permeability modifier is preferably the reaction product of a hydrophilic reactive polymer and a hydrophobic compound. Hydrophilic reactive polymers suitable for use in the aqueous solutions of this embodiment are preferably polymers containing reactive amino groups in the polymer backbone or as pendant groups. A more preferable polymer has dialkyl amino pendant groups. Most preferably the polymer has a dimethyl amino pendant group and is the product of a polymerization reaction in which at least one monomer is selected from dimethylaminoethyl methacrylate or dimethylaminopropyl methacrylamide. Suitable polymers include homo-, co- or terpolymers. Examples of such polymers include but are not limited to polyethyleneimine, polyvinylamine, poly(vinylamine/vinyl alcohol), chitosan, polylysine and alkyl acrylate polymers in general. Additional examples of alkyl acrylate polymers include polydimethylaminoethyl methacrylate, polydimethylaminopropyl methacrylamide, poly(acrylamide/dimethylaminoethyl methacrylate), poly(acrylamide/dimethylaminopropyl methacrylamide), and poly (acrylic acid/dimethylaminoethyl methacrylate). The most preferred polymers are polydimethylaminoethyl methacrylate and polydimethylaminopropyl methacrylamide.

Preferred hydrophobic compounds for use in this embodiment are alkyl halides. Preferably, the alkyl chain portion of the hydrophobic compound has from about 4 to about 30 carbons. A particularly preferred hydrophobic compound is cetyl bromide.

Additional hydrophobically modified water soluble polymers useful in the first embodiment are preferably prepared from a variety of hydrophilic monomers and hydrophobically modified hydrophilic monomers. Examples of particularly suitable hydrophilic monomers which can be utilized include acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, trimethylammoniumethyl methacrylate chloride, methacrylamide and hydroxyethyl acrylate. Of these, acrylamide, 2-acrylamido-2-methyl propane sulfonic acid, acrylic acid, dimethylaminoethyl methacrylate, dimethylaminopropyl methacrylamide and vinyl pyrrolidone are preferred.

A variety of hydrophobically modified hydrophilic monomers can also be utilized to form the polymers useful in accordance with this invention. Particularly suitable hydrophobically modified hydrophilic monomers include, but are not limited to, alkyl acrylates, alkyl methacrylates, alkyl acrylamides and alkyl methacrylamides wherein the alkyl radicals have from about 4 to about 22 carbon atoms; alkyl dimethylammoniumethyl methacrylate bromide, alkyl dimethylammoniumethyl methacrylate chloride and alkyl dimethylammoniumethyl methacrylate iodide wherein the alkyl radicals have from about 4 to about 22 carbon atoms; and alkyl dimethylammoniumpropyl methacrylamide bromide, alkyl dimethylammoniumpropyl methacrylamide chloride and alkyl dimethylammoniumpropyl methacrylamide iodide wherein the alkyl groups have from about 4 to about 22 carbon atoms. Of these, octadecyldimethylammoniumethyl methacrylate bromide, hexadecyldimethylammoniumethyl methacrylate bromide, hexadecyldimethylammoniumpropyl methacrylamide bromide, 2-ethylhexyl methacrylate and hexadecyl methacrylamide are preferred.

Polymers that are useful in accordance with this embodiment can be prepared by polymerizing any one or more of the hydrophilic monomers with any one or more of the hydrophobically modified hydrophilic monomers. Methods for preparing such polymers are known to those skilled in the art as represented by U.S. Pat. No. 6,476,169, the entire disclosure of which is incorporated herein by reference.

Accordingly, suitable polymers have estimated molecular weights in the range of from about 250,000 to about 3,000,000 and have mole ratios of the hydrophilic monomer(s) to the hydrophobically modified hydrophilic monomer(s) in the range of from about 99.98:0.02 to about 90:10. Particularly suitable polymers having molecular weights and mole ratios in the ranges set forth above include, but are not limited to, acrylamide/octadecyidimethylammoniumethyl methacrylate bromide copolymer, dimethylaminoethyl methacrylate/hexadecyldimethylammoniumethyl methacrylate bromide copolymer, dimethylaminoethyl methacrylate/vinyl pyrrolidone/hexadecyldimethylammoniumethyl methacrylate bromide terpolymer and acrylamide/2-acrylamido-2-methyl propane sulfonic acid/2-ethylhexyl methacrylate terpolymer. Of these, a dimethylaminoethyl methacrylate/hexadecyldimethylammoniumethyl methacrylate bromide copolymer having a mole ratio of hydrophilic monomer to hydrophobically modified hydrophilic monomer of 95:5 is a preferred pre-reacted hydrophobically modified relative permeability modifier.

In the second embodiment, the hydrophilically modified relative permeability modifier is preferably the reaction product of a hydrophilic reactive polymer and a hydrophilic compound. Hydrophilic reactive polymers suitable for use in the aqueous solutions of the second embodiment are preferably polymers containing reactive amino groups in the polymer backbone or as pendant groups. A more preferable polymer has dialkyl amino pendant groups. Most preferably, the polymer has a dimethyl amino pendant group and is the product of a polymerization reaction in which at least one monomer is selected from dimethylaminoethyl methacrylate or dimethylaminopropyl methacrylamide. Suitable polymers include homo-, co- or terpolymers. Examples of such polymers include but are not limited to polyethyleneimine, polyvinylamine, poly(vinylamine/vinyl alcohol), chitosan, polylysine and alkyl acrylate polymers in general. Additional examples of alkyl acrylate polymers include polydimethylaminoethyl methacrylate, polydimethylaminopropyl methacrylamide, poly(acrylamide/dimethylaminoethyl methacrylate), poly(acrylamide/dimethylaminopropyl methacrylamide), poly(acrylic acid/dimethylaminoethyl methacrylate). The most preferred polymers are polydimethylaminoethyl methacrylate and polydimethylaminopropyl methacrylamide.

Additional hydrophilic reactive polymers useful in the second embodiment are preferably prepared from a variety of hydrophilic monomers copolymerized with monomers containing reactive amino groups. Examples of particularly suitable hydrophilic monomers which can be utilized include, but are not limited to, acrylamide, 2-acrylamido-2-methyl propane sulfonic acid, N,N-dimethylacrylamide, vinyl pyrrolidone, acrylic acid, trimethylammoniumethyl methacrylate chloride, methacrylamide and hydroxyethyl acrylate. Of these, acrylamide, 2-acrylamido-2-methyl propane sulfonic acid, acrylic acid, and vinyl pyrrolidone are preferred.

The hydrophilic compounds suitable for reaction with the hydrophilic reactive polymers include halogen containing polyethers. Examples of such polyethers include polyethylene oxide, polypropylene oxide, polybutylene oxide, and mixtures thereof. The preferred halogen containing polyether is an epichlorohydrin terminated polyethyleneoxide methyl ether.

Accordingly, suitable polymers have estimated molecular weights in the range of from about 250,000 to about 3,000,000 and have weight ratios of the hydrophilic reactive polymers to the halogen containing polyethers in the range of from about 1:1 to about 10:1. Particularly suitable polymers having molecular weights and weight ratios in the ranges set forth above include, but are not limited to, the reaction product of polydimethylaminoethyl methacrylate with epichlorohydrin terminated polyethyleneoxide methyl ether, the reaction product of poly(acrylamide/dimethylaminoethyl methacrylate) with epichlorohydrin terminated polyethyleneoxide methyl ether, the reaction product of polydimethylaminopropyl methacrylamide with epichlorohydrin terminated polyethyleneoxide methyl ether, and the reaction product of poly(acrylamide/dimethylaminopropyl methacrylamide) with epichlorohydrin terminated polyethyleneoxide methyl ether. Of these, a polydimethylaminoethyl methacrylate epichlorohydrin terminated polyethyleneoxide methyl ether reaction product having a weight ratio of polydimethylaminoethyl methacrylate to epichlorohydrin terminated polyethyleneoxide methyl ether of 3:1 is preferred.

In a preferred embodiment of the invention, the aqueous well treatment fluid includes from about 0.1 to 3.0% by weight of the water soluble relative permeability modifier, and more preferably from about 0.2 to 1.0% by weight of the water soluble relative permeability modifier.

In operation, an aqueous well treatment fluid including a water soluble relative permeability modifier according to the foregoing is placed down hole in a well bore that includes water producing zones for modifying the permeability of the water producing zones without affecting the production of hydrocarbons.

In a first embodiment of operation, the relative permeability modifier is mixed with an aqueous well treatment fluid. Applicants propose that during the normal "leak-off" of aqueous well treatment fluids into the formation, the relative permeability modifier is adsorbed into the formation. As shown in the accompanying examples, this leads to a significant percentage reduction in water permeability.

It can be readily appreciated that an aqueous well treatment fluid including a relative permeability modifier according to the foregoing is advantageous because it can provide improved zonal isolation between zones at the time of completion, eliminate or postpone the need for water shutoff during the production phase of the well, and extend the production phase of the well life.

In carrying out the methods of the present embodiment, an aqueous well treatment fluid comprising a relative permeability modifier is provided. The aqueous well treatment fluid is introduced into a subterranean zone through a well bore penetrating the subterranean zone. The relative permeability modifier is allowed to decrease the co-production of water with hydrocarbons.

In other methods of the present embodiment, a well bore treating fluid is introduced into a well bore to separate a first fluid from a second fluid and to displace the first fluid from the wellbore in advance of the second fluid. In such methods, the wellbore treating fluid includes a water soluble relative permeability modifier, and the water soluble relative permeability modifier includes a hydrophobically modified water soluble polymer or a hydrophilically modified water soluble polymer. According to such methods, the water permeability of the well bore is reduced.

The following examples are illustrative of the methods and compositions discussed above.

EXAMPLE 1

A relative permeability modifying polymer of the present embodiment can be made by mixing 47.7 grams ("g") deionized water, 0.38 g n-hexadecyl dimethylammonium ethyl methacrylate bromide, and 1.1 g acrylamide, and sparging with nitrogen for approximately 30 minutes. Thereafter, a polymerization initiator, such as 0.0127 g of 2,2'-azo bis (2-amidinopropane) dihydrochloride is added. The resulting solution is then heated, with stirring, to 110° F. and held for 18 hours to produce a highly viscous polymer solution.

EXAMPLE 2

A relative permeability modifying polymer of the present embodiment can be made by mixing 41.2 g deionized water, 0.06 g of octadecyl methacrylate, 0.45 g of a cocoamidopropyl betaine surfactant, and 1.26 g acrylamide. Thereafter, a polymerization initiator, such as 0.0127 g of 2,2'-azo bis (2-amidinopropane) dihydrochloride is added. The resulting solution is then heated, with stirring, to 110° F. and held for 18 hours to produce a highly viscous polymer solution.

EXAMPLE 3

A polymer can be made by mixing 1968.0 g deionized water, 105.0 g dimethylaminoethyl methacrylate (DMEMA) and sparging with nitrogen for 30 minutes. Thereafter, the pH is adjusted to approximately 7.9 with sulfuric acid and a polymerization initiator, such as 0.46 g of 2,2'-azo bis (2-amidinopropane) dihydrochloride is added to form poly-DMEMA.

The poly-DMEMA is then hydrophobically modified by adding 71.0 g of poly-DMEMA to a 250 mL round bottom flask, followed by 15% NaOH to achieve a pH of approximately 8.9. Next, 54.6 g water, 0.36 g C16 alkyl (n-hexadecyl) bromide, and 0.39 g benzylcetyldimethylammonium bromide surfactant are added to quaternize the poly-DMEMA homopolymer and form a DMEMA—n-hexadecyl alkyl-DMEMA copolymer. This mixture is then heated, with stirring, to 140° F. for 24 hours to produce a highly viscous polymer solution, namely, the relative permeability modifying polymer.

EXAMPLE 4

A relative permeability modifying polymer was prepared comprising a pH 6 solution of 2% potassium chloride by weight and 6000 ppm $C_{1-6}$ alkyl poly-DMEMA polymer from EXAMPLE 3 to conduct a conventional water permeability reduction test. The test was carried out at 200° F. utilizing a Hassler sleeve containing a Berea brown sandstone core and having three pressure taps (as well as an inlet and an outlet for determining pressure), thereby dividing the core into four segments. The core experiences a flow sequence conventionally referred to as 1) water, 2) oil, 3) water, 4) treatment fluid, and 5) water. The water used in the permeability reduction test is a brine containing 9% sodium chloride by weight and 1% calcium chloride by weight. The oil used in the permeability reduction test is kerosene.

The first two flow steps (water, oil) prepare the core for the test. In the third flow step, the brine was passed through the core until the pressure stabilized, and the initial permeability of the core was measured by determining the pressure at the pressure taps and outlet. The results are listed in TABLE 2 as "Initial Core Permeability." Thereafter, the treatment fluid containing the relative permeability modifying polymer was passed through the core. Next, brine was passed through the core to determine the permeability of the core after treatment. This data was used to calculate a percentage reduction in permeability according to the formula:

(1−(final permeability/initial permeability))×100

The results are reported in TABLE 2 as "Percent Reduction of Water Permeability." The Initial Core Permeability and Final Core Permeability are reported in millidarcy ("mD") units.

TABLE 2

| | Initial Core Permeability ("mD") | Final Core Permeability ("mD") | Percent Reduction of Water Permeability |
| --- | --- | --- | --- |
| Total | 465 | 4.65 | 99 |
| Segment 1 | 782 | — | — |
| Segment 2 | 322 | 3.22 | 99 |
| Segment 3 | 465 | 4.65 | 99 |
| Segment 4 | 1095 | 10.95 | 99 |

The polymer is very effective, as TABLE 2 shows a 99% brine permeability reduction.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention as defined in the following claims.

The invention claimed is:

1. A method of reducing the water permeability of a well bore in a formation, comprising:

introducing into the wellbore a treating fluid for separating a first fluid from a second fluid and for displacing the first fluid from the wellbore in advance of the second fluid, the treating fluid comprising a water soluble relative permeability modifier, wherein the water soluble relative permeability modifier comprises a hydrophobically modified water soluble polymer, the hydrophobically modified water soluble polymer being a reaction product of a hydrophilic reactive polymer and a hydrophobic compound, wherein the hydrophobic compound comprises an alkyl halide; and allowing the treating fluid to enter the formation, thereby allowing the water soluble relative permeability modifier to be adsorbed into the formation, which adsorption causes a reduction in the water permeability of the wellbore without substantially reducing the hydrocarbon permeability thereof.

2. The method of claim 1, wherein the alkyl halide comprises an alkyl chain of from about 4 to about 30 carbon atoms.

3. The method of claim 1, wherein the hydrophobic compound comprises cetyl bromide.

4. A method of reducing the water permeability of a well bore, comprising:

introducing into the wellbore a treating fluid for separating a first fluid from a second fluid and for displacing the first fluid from the wellbore in advance of the second fluid, the treating fluid comprising a water soluble relative permeability modifier, wherein the water soluble relative permeability modifier comprises a hydrophobically modified water soluble polymer, the hydrophobically modified water soluble polymer being a reaction product of a hydrophilic reactive polymer and a hydrophobic compound, wherein the hydrophilic reactive polymer comprises a reactive amino group, thereby reducing the water permeability of the well bore.

5. The method of claim 4, wherein the reactive amino group is located in the polymer backbone or is a pendant group.

6. The method of claim 4, wherein the hydrophilic reactive polymer comprises a dialkyl amino pendant group.

7. The method of claim 4, wherein the hydrophilic reactive polymer comprises a dimethyl amino pendant group.

8. The method of claim 4, wherein the hydrophilic reactive polymer is a product of a polymerization reaction in which at least one monomer is selected from the group consisting of dimethylaminoethyl methacrylate and dimethylaminopropyl methacrylamide.

9. The method of claim 4, wherein the hydrophilic reactive polymer is a homo-, co- or terpolymer.

10. The method of claim 4, wherein the hydrophilic reactive polymer is selected from the group consisting of polyethyleneimine, polyvinylamine, poly(vinylamine/vinyl alcohol), chitosan and polylysine.

11. The method of claim 4, wherein the hydrophilic reactive polymer comprises an alkyl acrylate polymer.

12. The method of claim 11, wherein the alkyl acrylate polymer is selected from the group consisting of polydimethylaminoethyl methacrylate, polydimethylaminopropyl methacrylamide, poly(acrylamide/dimethylaminoethyl methacrylate), poly(acrylamide/dimethylaminopropyl methacrylamide) and poly(acrylic acid/dimethylaminoethyl methacrylate).

13. The method of claim 12, wherein the alkyl acrylate polymer is selected from the group consisting of polydimethylaminoethyl methacrylate and polydimethylaminopropyl methacrylamide.

14. A method of reducing the water permeability of a well bore in a formation, comprising:
  introducing into the wellbore a treating fluid for separating a first fluid from a second fluid and for displacing the first fluid from the wellbore in advance of the second fluid, the treating fluid comprising a water soluble relative permeability modifier, wherein the water soluble relative permeability modifier comprises a hydrophobically modified water soluble polymer, the hydrophobically modified water soluble polymer being a reaction product of a hydrophilic monomer and a hydrophobically modified hydrophilic monomer;
  wherein the hydrophilic monomer is selected from the group consisting of N,N-dimethylacrylamide, vinyl pyrrolidone, dimethylaminoethyl methacrylate, dimethylaminopropylmethacrylamide, vinyl amine, trimethylammoniumethyl methacrylate chloride and hydroxyethyl acrylate, and
  allowing the treating fluid to enter the formation, thereby allowing the water soluble relative permeability modifier to be adsorbed into the formation, which adsorption causes a reduction in the water permeability of the wellbore without substantially reducing the hydrocarbon permeability thereof.

15. The method of claim 14, wherein the hydrophilic monomer is selected from the group consisting of dimethylaminoethyl methacrylate, dimethylaminopropyl methacrylamide and vinyl pyrrolidone.

16. The method of claim 14, wherein the hydrophobically modified hydrophilic monomer is selected from the group consisting of alkyl methacrylates and alkyl methacrylamides wherein the alkyl radicals have from about 4 to about 22 carbon atoms; alkyl dimethylammoniumethyl methacrylate bromide, alkyl dimethylammoniumethyl methacrylate chloride and alkyl dimethylammoniumethyl methacrylate iodide wherein the alkyl radicals have from about 4 to about 22 carbon atoms; and alkyl dimethylammoniumpropyl methacrylamide bromide, alkyl dimethylammoniumpropyl methacrylamide chloride and alkyl dimethylammoniumpropyl methacrylamide iodide wherein the alkyl groups have from about 4 to about 22 carbon atoms.

17. The method of claim 16, wherein the hydrophobically modified hydrophilic monomer is selected from the group consisting of octadecyldimethylammoniumethyl methacrylate bromide, hexadecyldimethylammoniumethyl methacrylate bromide, hexadecyldimethylammoniumpropyl methacrylamide bromide, 2-ethylhexyl methacrylate and hexadecyl methacrylamide.

18. The method of claim 14, wherein the hydrophobically modified water soluble polymer has a molecular weight in the range of from about 250,000 to about 3,000,000.

19. The method of claim 14, wherein the hydrophilic monomer and the hydrophobically modified hydrophilic monomer are present in the hydrophobically modified water soluble polymer at a mole ratio of from about 99.98:0.02 to about 90:10.

20. A method of reducing the water permeability of a well bore in a formation, comprising:
  introducing into the wellbore a treating fluid for separating a first fluid from a second fluid and for displacing the first fluid from the wellbore in advance of the second fluid, the treating fluid comprising a water soluble relative permeability modifier, wherein the water soluble relative permeability modifier comprises a hydrophobically modified water soluble polymer is selected from the group consisting of acrylamide/octadecyldimethylammoniumethyl methacrylate bromide copolymer, dimethylaminoethyl methacrylate/hexadecyldimethylammoniumethyl methacrylate bromide copolymer, dimethylaminoethyl methacrylate/vinyl pyrrolidone/hexadecyldimethylammoniumethyl methacrylate bromide terpolymer and acrylamide/2-acrylamido-2-methyl propane sulfonic acid/2-ethylhexyl methacrylate terpolymer; and
  allowing the treating fluid to enter the formation, thereby allowing the water soluble relative permeability modifier to be adsorbed into the formation, which adsorption causes a reduction in the water permeability of the wellbore without substantially reducing the hydrocarbon permeability thereof.

21. The method of claim 20, wherein the hydrophobically modified water soluble polymer comprises a dimethylaminoethyl methacrylate/hexadecyldimethylammoniumethyl methacrylate bromide copolymer having a mole ratio of hydrophilic monomer to hydrophobically modified hydrophilic monomer of 95:5.

* * * * *